No. 629,559. Patented July 25, 1899.
E. W. GRIFFITHS.
WEED AND TRASH CUTTER FOR HOE AND LISTER DRILLS.
(Application filed Dec. 20, 1898.)
(No Model.)
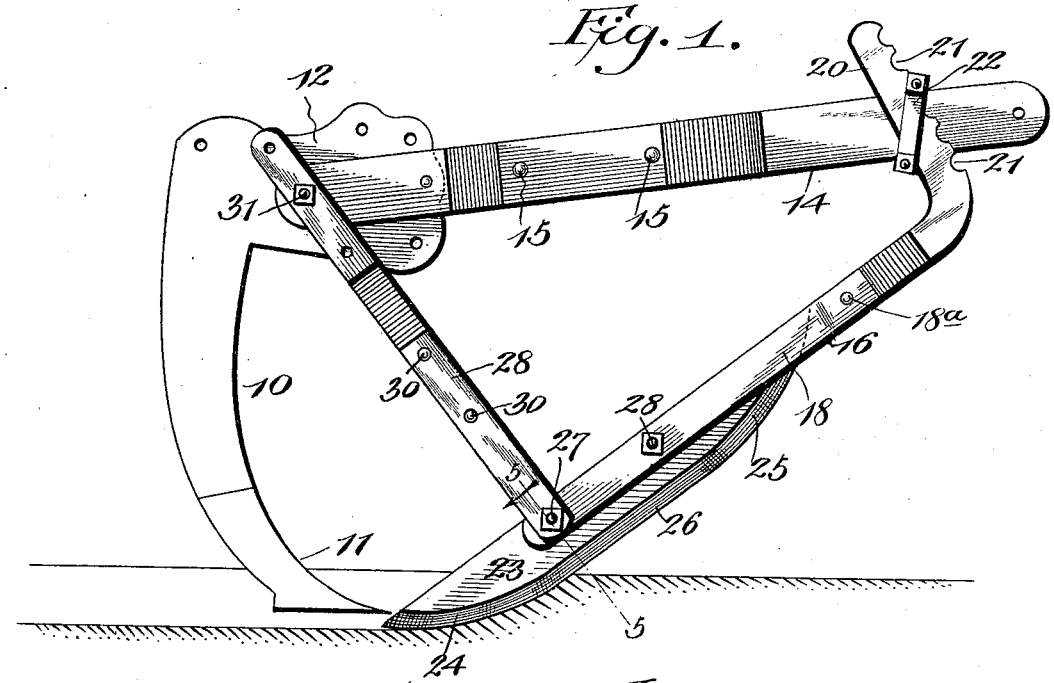
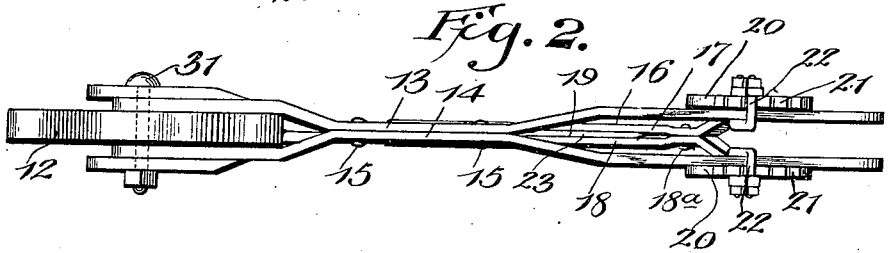
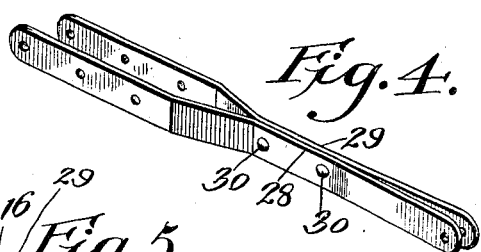
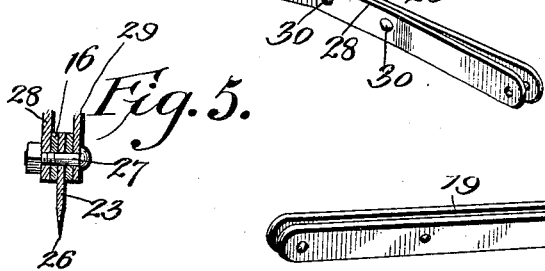
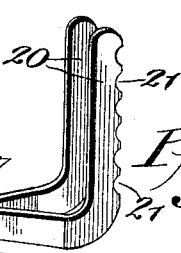
Witnesses
Ellis W. Griffiths, Inventor.
By his Attorneys.

UNITED STATES PATENT OFFICE.

ELLIS W. GRIFFITHS, OF GALVA, KANSAS, ASSIGNOR OF ONE-HALF TO FRANCIS D. NICHOLS, OF NORFOLK, KANSAS.

WEED AND TRASH CUTTER FOR HOE AND LISTER DRILLS.

SPECIFICATION forming part of Letters Patent No. 629,559, dated July 25, 1899.

Application filed December 20, 1898. Serial No. 699,836. (No model.)

*To all whom it may concern:*

Be it known that I, ELLIS W. GRIFFITHS, a citizen of the United States, residing at Galva, in the county of McPherson and State of Kansas, have invented a new and useful Weed and Trash Cutter for Hoe and Lister Drills, of which the following is a specification.

My invention relates to a weed and trash cutter for hoe and lister drills; and the object in view is to provide an attachment which is especially designed for cutting under the horizontal path of the point of the hoe or lister drill.

It is a common practice for farmers in plowing ground to turn under a large amount of trash and vegetable growths, and when the grain is drilled into the ground it is found that the points of the drill-hoes encounter the plowed-under trash, which causes a great deal of trouble by the trash accumulating on the point of the drill-hoes and preventing proper covering of the grain. I aim to overcome this objection by the provision of an attachment which will cut below the point of the drill-hoe and either clear a path for the drill-point to run at the proper depth or hold the trash down, so as to allow the drill-point to deposit the seed without being molested or interferred with by the trash.

A further object of the invention is to provide means by which the knife may be adjusted to run or cut at any proper depth in the ground, to the end that the knife may be used on soil having the trash, such as cornstalks or sunflowers, on top of the ground.

A further object of the invention is to provide an improved construction of knife and a means for carrying the same, so that the knife is rendered reversible in order to bring either of its ends into service, thus presenting a sharp cutting edge to the ground and prolong the life and serviceability of the attachment.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a side elevation of a drill-hoe and its beam with my weed and trash cutting attachment applied thereto. Fig. 2 is a top plan view of the parts represented by Fig. 1. Fig. 3 is a detail perspective view of the knife-hanger. Fig. 4 is a like perspective view of the brace. Fig. 5 is a sectional view through the hanger and the knife-blade fastened thereto on the plane indicated by the dotted line 5 5 of Fig. 1.

Like numerals of reference denote like and corresponding parts in each of the several figures of the drawings.

In order that others may understand my invention, I have illustrated the same applied to the parts of an ordinary drill with which the attachment coacts; but I would have it understood that the drill-hoe 10 and the hoe-beam may be of any construction known to those skilled in the art, because the trash and weed cutting attachment may be used in connection with hoe-drills or with lister-drills of any type of construction. As shown by the drawings, the drill-hoe 10 is provided at its lower forward extremity with a point-blade 11, and it is also provided with an apertured plate or head 12 for the attachment of the hoe-beam and the brace of the cutter appliance. The hoe-beam consists of plates or bars 13 14, which are riveted or bolted together, as at 15, at points intermediate of their length, and the rear end of this two-part hoe-beam is spread to form a fork adapted to embrace the plate or head 12 of the drill-hoe. The front end of the hoe-beam has the members thereof spread or deflected to provide a fork adapted for connection in any preferred way to a part of the drill-frame. (Not shown.)

In view of the common practice of turning under trash and weeds before sowing or drilling the seed into the ground it has been found to be impracticable to provide a rotary colter for clearing the path of the drill-point when drilling the grain. In the present invention I employ a knife, which is hung or supported for its lower end to lie contiguous to and to cut into the ground under the horizontal path of the hoe-point 11, and in practice this knife cuts through the weeds or trash below the path of the point or blade 11, or it holds the weeds or trash in a depressed condition below the path of said hoe point or blade to the end that the seed may be drilled and properly covered without interference with the hoe or accumulating on the point or blade thereof.

In order that the knife appliance may be used in connection with any drill or lister, I employ a hanger which is adapted to carry the knife and is braced to the drill-hoe when it is fitted to the drill. The hanger is indicated in its entirety by the numeral 16, and it consists of the members 17 18, which are applied laterally together and bolted or riveted firmly at points intermediate of their length, as at 18ª. One end of the hanger is spread to provide the fork 19, and the members 17 18 are bent at their opposite ends to form the angular arms 20, which arms are spread or spaced for the purpose of making the angular end of the hanger embrace the hoe-beam. The angular end of this hanger, formed by the arms 20, is adapted to straddle the forked front end of the hoe-beam, and said arms have their upper ends notched, as at 21, to properly receive the clamps 22. I employ two of these clamps for firmly uniting the branched angular upper end of the knife-hanger to the hoe-beam, and these clamps are applied individually to the branches of the hoe-beam and the hanger to assume diagonal positions across the lapped parts of said hanger and beam. It will be observed that each clamp is fitted in a notch of the hanger and extends across the overlapped parts of the beam and hanger, and these clamps serve to firmly unite the beam and hanger for the latter to resist the upward stress or pressure when the knife attachment is in service.

The knife-blade 23 is inserted in the forked lower end 19 of the hanger. This knife-blade is a single flat piece of steel drawn to a cutting edge and highly polished, and to prolong the life and service of the blade it is made double-ended and secured reversibly to the forked lower end of the hanger. The blade is rounded at its ends, as at 24 25, and at one edge it is made with a continuous cutting edge 26, which extends along the rounded ends 24 25 thereof. The knife-blade is inserted in the forked end 19 of the hanger for one pointed end, 24 or 25, to project below the hanger, and when the projecting end of said blade becomes dulled through service the knife-blade may be reversed to cause its other sharpened end to extend below the hanger, as is obvious. The forked end of the hanger and the knife-blade inserted therein are secured firmly together by the bolts 27 28, which pass through coincident openings in the blade in the hanger, and the openings in the blade are so formed therein as to insure registration with the openings in the hanger without regard to the position of the knife-blade when it is reversed end for end.

The brace which I employ consists of two bars 28 29, which are riveted or bolted together at 30, and this brace has its ends forked or spread in order to embrace the hanger and the head of the drill-hoe, respectively. The lower forked end of the brace is connected to the hanger by one of the bolts, as 27, which fastens the knife-blade to said hanger; but the upper forked end of the brace is designed to be fitted to the drill-hoe in such relation to the head or plate thereof and the rear forked end of the hoe-beam as to be secured in place along with the hoe-beam by a single fastening-bolt 31.

In applying my attachment to an ordinary hoe-drill the angular branched end of the hanger 16 is fitted to the hoe-beam and the brace is connected to the drill-hoe by the bolt 31, which attaches the hoe-beam thereto. The hanger and knife-blade assume an inclined position with relation to the hoe-beam, and if the machine is to be used in soil which has the trash or weeds turned under the hanger is adjusted by raising or lowering the same for the lower pointed end of the knife-blade to assume a position contiguous to and below the path of the blade or point on the drill-hoe, after which the clamps 22 are applied to secure the hanger and knife-blade firmly in their adjusted positions. It will be seen that the lower pointed end of the knife-blade will cut through the soil to a depth below the horizontal path of the hoe point or blade, and the knife-blade 23 will thus cut a path through the trash for the hoe-point or will keep the path depressed below the path of the hoe-point, whereby the trash is prevented from accumulating on the hoe and the grain may be drilled without hindrance from the trash. It is evident that the knife can be adjusted to run at any depth desired, and as the knife is drawn to a cutting edge it will cut away the weeds and trash in advance of the hoe-point. By proper adjustment of the hanger the knife can be raised so as to run or cut through the trash on top of the ground when the trash and vegetable growths are not turned or plowed under.

The attachment may be used on any hoe or lister drill, its knife-blade may be reversed end for end, and it is simple and durable in construction and cheap of manufacture.

Changes may be made in the form and proportion of some of the parts, while their essential features are retained and the spirit of the invention embodied. Hence I do not desire to be limited to the precise form of all the parts as shown, reserving the right to vary therefrom.

Having thus described the invention, what I claim is—

1. The combination with a drill-hoe, and a hoe-beam, of a two-part hanger having the members bent to form the angular arms at the upper front end of said hanger and adapted to straddle the hoe-beam, a clip fitted to the beam and engaging with the angular arms of said hanger to adjustably fasten the hanger and beam together, and a knife-blade secured between the members of said hanger, the heel of the blade extending beyond the hanger and terminating in a position below and in advance of the hoe-point, substantially as described.

2. The combination with a hoe-beam, and a drill-hoe, of a two-part hanger arranged in an inclined position to the beam and secured thereto, a knife-blade fitted between the members of said hanger and reversible end for end therein, clamping-bolts which unite the blade and the members of the hanger detachably together, and a brace having one end secured to the hanger by a bolt that attaches the blade to said hanger, substantially as described.

3. A weed and trash cutting attachment for drills, consisting of a two-part hanger having means for attachment to a hoe-beam, a double-ended knife secured reversibly in said hanger in an inclined position for its lower sharpened edge to lie below the hanger, and for its rear end to project beyond said hanger, and a brace fastened to the hanger and adapted for connection to a drill-hoe; substantially as described.

4. The combination with a hoe-beam and a drill-hoe, of a hanger having the branched angular upper end arranged to straddle the hoe-beam, clamps for securing said branched end of the hanger to said beam, an inclined knife clamped to the lower end of said hanger to project below the same and to lie contiguous to a point of the drill-hoe, and a brace which unites the hanger and drill-hoe together, substantially as described.

In testimony that I claim the foregoing as my own I have hereto affixed my signature in the presence of two witnesses.

ELLIS W. GRIFFITHS.

Witnesses:
JOHN GIFFIN,
C. R. WHITNEY.